United States Patent
Zhang et al.

(10) Patent No.: US 9,596,484 B2
(45) Date of Patent: Mar. 14, 2017

(54) METHOD OF DEPTH INTRA PREDICTION USING DEPTH MAP MODELLING

(71) Applicant: HFI INNOVATION INC., Zhubei, Hsinchu County (TW)

(72) Inventors: Kai Zhang, Beijing (CN); Jicheng An, Beijing (CN); Jian-Liang Lin, Yilan (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 357 days.

(21) Appl. No.: 14/285,658

(22) Filed: May 23, 2014

(65) Prior Publication Data

US 2015/0010049 A1    Jan. 8, 2015

(51) Int. Cl.
| | |
|---|---|
| *H04N 19/597* | (2014.01) |
| *H04N 19/159* | (2014.01) |
| *H04N 19/105* | (2014.01) |
| *H04N 19/174* | (2014.01) |
| *H04N 19/51* | (2014.01) |
| *H04N 19/583* | (2014.01) |
| *H04N 19/52* | (2014.01) |

(52) U.S. Cl.
CPC ......... *H04N 19/597* (2014.11); *H04N 19/105* (2014.11); *H04N 19/159* (2014.11); *H04N 19/174* (2014.11); *H04N 19/52* (2014.11)

(58) Field of Classification Search
CPC .. H04N 19/105; H04N 19/159; H04N 19/174; H04N 19/52; H04N 19/597; H04N 19/51; H04N 19/583

USPC ...................................... 375/240.02
See application file for complete search history.

(56) References Cited

U.S. PATENT DOCUMENTS

| | | | |
|---|---|---|---|
| 2012/0183057 A1* | 7/2012 | Oh ........................ | H04N 19/463 375/240.12 |
| 2014/0253682 A1* | 9/2014 | Zhang ................ | H04N 13/0048 348/43 |

(Continued)

OTHER PUBLICATIONS

Oh, B.T., et al.; "3D-CE6.h Related Results on Depth Intra Prediction JCT2-A0032;" Joint Collaborative Team on 3D Video Coding Extension Development of ITU-T SG 16 WP 3 and ISO/IEC JTC 1/SC 29/WG 11; Jul. 2012; pp. 1-4.

*Primary Examiner* — Francis G Geroleo
(74) *Attorney, Agent, or Firm* — McClure, Qualey & Rodack, LLP

(57) ABSTRACT

A method of depth map coding for a three-dimensional video coding system incorporating extended reconstructed neighboring depth samples is disclosed. The depth block is partitioned into one or more segments. A prediction value for each segment is derived based on reconstructed neighboring depth samples. The reconstructed neighboring depth samples for at least one segment include at least one reconstructed sample from an extended top neighboring row or an extended left neighboring column. The extended top neighboring row includes at least one extended top-row reconstructed depth sample located adjacent to top side of a second depth block adjacent to right side of the current depth block. The extended left neighboring column includes at least one extended left-column reconstructed depth sample located adjacent to left side of a third depth block adjacent to bottom side of the current depth block.

9 Claims, 4 Drawing Sheets

(56) References Cited

U.S. PATENT DOCUMENTS

| | | | | |
|---|---|---|---|---|
| 2014/0307786 A1* | 10/2014 | Deng | ................ | H04N 13/0007 |
| | | | | 375/240.12 |
| 2014/0307787 A1* | 10/2014 | Zheng | ................ | H04N 19/597 |
| | | | | 375/240.12 |
| 2015/0124867 A1* | 5/2015 | Jaeger | ................ | H04N 19/597 |
| | | | | 375/240.02 |
| 2015/0229957 A1* | 8/2015 | Zhao | ................ | H04N 19/597 |
| | | | | 375/240.12 |
| 2015/0245061 A1* | 8/2015 | Chen | ................ | H04N 19/597 |
| | | | | 375/240.13 |
| 2015/0350677 A1* | 12/2015 | Lim | ................ | H04N 19/463 |
| | | | | 375/240.12 |
| 2016/0029038 A1* | 1/2016 | Zhao | ................ | H04N 19/119 |
| | | | | 375/240.12 |
| 2016/0050419 A1* | 2/2016 | Zhao | ................ | H04N 19/597 |
| | | | | 375/240.12 |

\* cited by examiner

(a) Case 1

(b) Case 2

(c) Case 3

(d) Case 4

*Fig. 2 (Prior Art)*

METHOD OF DEPTH INTRA PREDICTION USING DEPTH MAP MODELLING

CROSS REFERENCE TO RELATED APPLICATIONS

The present invention claims priority to PCT Patent Application, Serial No. PCT/CN2013/078866, filed on Jul. 5, 2013, entitled "A Simplified DC Prediction Method in Intra Prediction". The PCT Patent Application is hereby incorporated by reference in its entirety.

FIELD OF THE INVENTION

The present invention relates to three-dimensional video coding. In particular, the present invention relates to Intra prediction for depth map coding using Depth Map Modelling (DMM) in a three-dimensional (3D) coding system.

BACKGROUND AND RELATED ART

Three-dimensional (3D) television has been a technology trend in recent years that intends to bring viewers sensational viewing experience. Various technologies have been developed to enable 3D viewing and the multi-view video is a key technology for 3DTV application among others. For 3D coding, depth maps are also coded along with the texture data.

In 3D-HEVC, partition-based methods are applied for depth map Intra coding. The partition-based methods use depth map modelling (DMM) to form prediction of the current depth block based on reconstructed neighboring depth pixels. With partition-based depth map Intra coding methods, a depth block is partitioned into two segments, named as $P_0$ and $P_1$ in the examples of FIG. 1. Each segment is represented by a single constant value, also called a DC value. In FIG. 1, DC values, $DC_0$ and $DC_1$ are selected for segments $P_0$ and $P_1$ respectively. For depth map Intra coding, a delta DC/residual value is determined and explicitly signalled in the bitstream so that reconstructed depth maps can be formed according to the DC values and the transmitted delta DC/residual value.

In the current 3D-HEVC development, DMM prediction partition a depth block into two segments according to four partition patterns, also called "cases" as shown in FIG. 2. The dmm prediction cases are described in the following pseudo codes.

bT=(bPattern$_{0,0}$!=bPattern$_{N-1,0}$)? 1:0; and
bL=(bPattern$_{0,0}$ !=bPattern$_{0,N-1}$)? 1:0, where bPattern$_{X,Y}$ represents the segment number of sample (X,Y), bPattern$_{X,Y}$=0 if the sample at (X,Y) is in segment 0, and bPattern$_{X,Y}$=1 if the sample at (X,Y) in segment 1. As shown in the above equations, bT is an indication that the two ending depth samples in the top row of the current depth block are not in the same segment, and bL is an indication that the two ending depth samples in the left column of the current depth block are not in the same segment. The four cases of DMM prediction mode are determined as follows.

Case 1: bT==bL && bL==1,
  $DC_X=(p_{-1,0}+p_{0,-1})>>1$, and
  $DC_{1-X}=(p_{-1,N-1}+p_{N-1,-1})>>1$.
Case 2: bT==bL && bL==0,
  $DC_X=(p_{-1,0}+p_{0,-1})>>1$, and
  $DC_{1-X}=2^{B-1}$, where B represents the bit depth.
Case 3: bT !=bL && bL==1,
  $DC_X=p_{(N-1)>>1,-1}$, and
  $DC_{1-X}=p_{-1,N-1}$.
Case 4: bT !=bL && bL==0,
  $DC_X=p_{-1,(N-1)>>1}$, and
  $DC_{1-X}=p_{N-1,-1}$.

As shown in FIG. 2, both case 1 and case 2 have similar partition patterns. However, segment 0 in case 2 covers the entire top row and left column. In this case, segment 1 in case 2 is filled by a DC value corresponding to half of the maximum depth value (i.e. $2^B/2$). For case 1, segment 0 does not cover the entire top row and does not cover the entire left column. Segment 1 in case 1 is filled by a DC value derived from $p_{-1,N-1}$ and $p_{N-1,-1}$. For segment 0, the DC value is determined from $p_{-1,0}$ and $p_{0,-1}$ in the same way for both case 1 and case 2.

It is desirable to simplify the depth Intra prediction process without noticeable impact on the performance.

BRIEF SUMMARY OF THE INVENTION

A method of depth map coding for a three-dimensional video coding system incorporating extended reconstructed neighboring depth samples according to the present invention is disclosed. The depth block is partitioned into one or more segments. According to one embodiment, a prediction value for each segment is derived based on reconstructed neighboring depth samples, wherein the reconstructed neighboring depth samples for at least one segment comprise at least one reconstructed sample from an extended top neighboring row or an extended left neighboring column. The extended top neighboring row includes at least one extended top-row reconstructed depth sample located adjacent to top side of a second depth block adjacent to right side of the current depth block. The extended left neighboring column includes at least one extended left-column reconstructed depth sample located adjacent to left side of a third depth block adjacent to bottom side of the current depth block. The derived prediction value is then used to encode or decode each segment of the current depth block.

In one embodiment, the current depth block may correspond to an N×N block, and N is an integer. $P_{0,0}$ refers to the upper-left corner sample of the current depth block and $P_{(N-1),(N-1)}$ refers to the lower-right corner sample of the current depth block. The extended top neighboring row corresponds to $\{P_{N,-1}, \ldots, P_{2N-1,-1}\}$, the extended left neighboring column corresponds to $\{P_{-1,N}, \ldots, P_{-1,2N-1}\}$. The prediction value for one segment can be calculated as $(P_{X,-1}+P_{-1,X}+1)>>1$ or $(P_{X,-1}+P_{-1,X})>>1$, where ">>" corresponds to a right-shift operation, where X is selected from a group of integers staring from 0 to (2N−1). The prediction value for one segment may also be calculated as $P_{X,-1}$ or $P_{-1,X}$. The reconstructed neighboring depth samples may further comprise $P_{-1,-1}$.

In another embodiment of the present invention, the current depth block is partitioned into two segments according to at least two DMM (depth map modelling) prediction modes and the DMM prediction modes comprise a unified DMM prediction mode. The prediction value is derived for each segment and for each DMM prediction mode. The DMM prediction mode is determined based on a first result of a first test and a second result of a second test, the first test corresponds to whether $P_{0,0}$ and $P_{0,(N-1)}$ are in different segments, the second test corresponds to whether $P_{0,0}$ and $P_{(N-1),0}$ are in different segments, the unified DMM prediction mode includes a first case corresponding to the first result and the second result being both true and a second case corresponding to the first result and the second result being both false. Said at least two DMM prediction modes may comprise a second DMM prediction mode corresponding to the first result being true and the second result being false, or corresponding to the first result being false and the second result being true.

In one embodiment, the prediction value for the first segment of said two segments in the unified DMM prediction mode is derived from $P_{-1,0}$ and $P_{0,-1}$ and the prediction value for the second segment of said two segments in the unified DMM prediction mode is derived from $P_{-1,2N-1}$ and $P_{2N-1,-1}$. In another embodiment, the prediction value for the first segment of said two segments in the unified DMM prediction mode is derived according to $(P_{-1,0}+P_{0,-1})\!>\!>\!1$ and the prediction value for the second segment of said two segments in the unified DMM prediction mode is derived according to $(P_{-1,2N-1}+P_{2N-1,-1})\!>\!>\!1$.

The embodiment to partition the current depth block into two segments according to at least two DMM (depth map modelling) prediction modes including a unified DMM prediction mode can be incorporated into the embodiment that uses an extended top neighboring row or an extended left neighboring column to derive the prediction value for at least one segment.

BRIEF DESCRIPTION OF THE DRAWINGS

FIG. 1 illustrates an example of depth Intra prediction using depth map modelling (DMM), where the depth is partitioned into two segments.

FIG. 2 illustrates an example of depth Intra prediction using depth map modelling (DMM) according to a conventional High Efficiency Video Coding (HEVC) based three-dimensional coding, where the partition for DMM prediction mode is classified into four cases.

FIG. 3 illustrates an example of reconstructed neighboring depth samples including extended top-row neighboring samples and extended left-column neighboring samples.

DETAILED DESCRIPTION OF THE INVENTION

Figure 4:
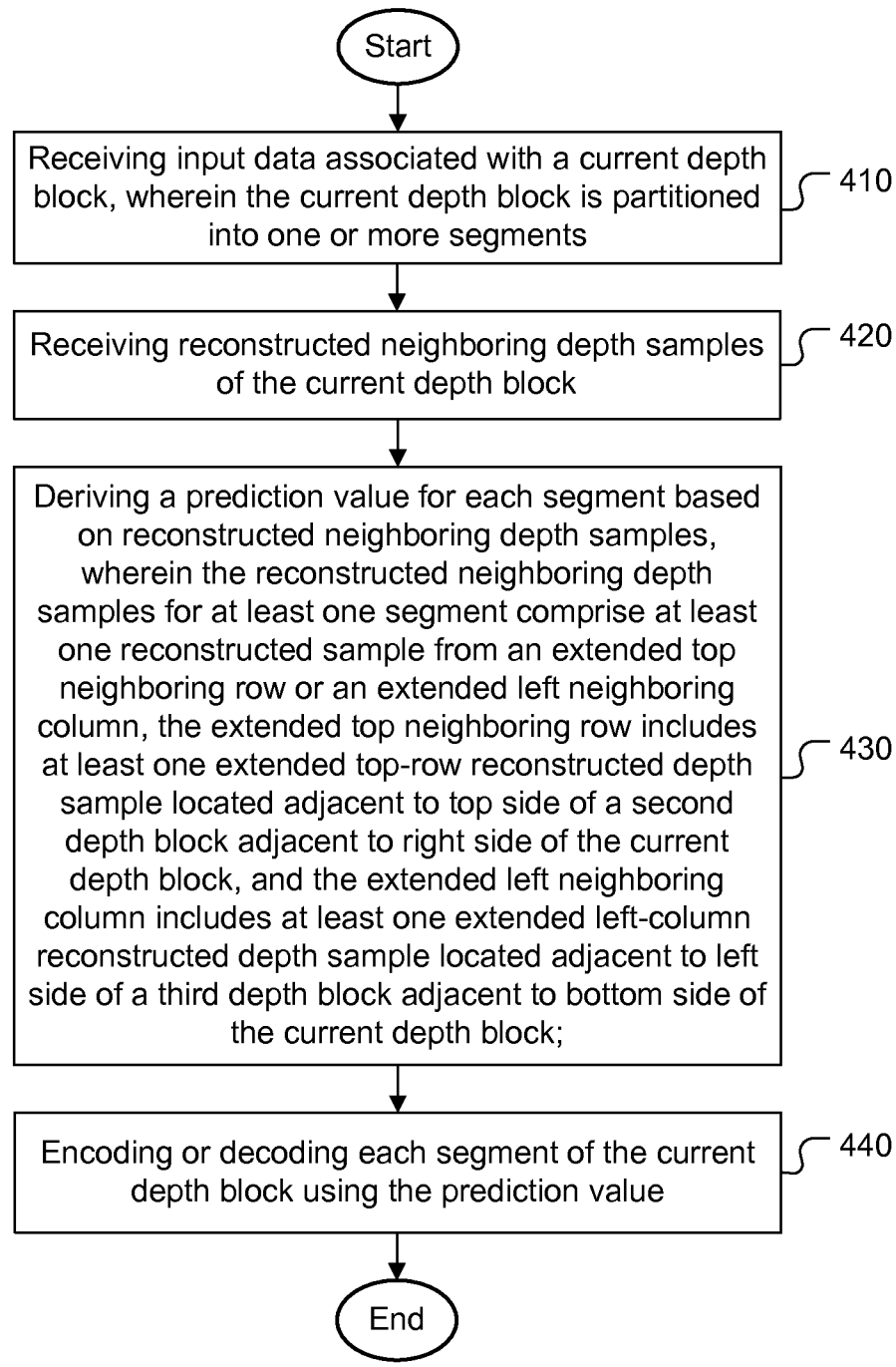
FIG. 4 illustrates an exemplary flowchart of a three-dimensional video coding system incorporating an embodiment of the present invention to derive prediction value for at least one segment using at least one sample from extended top-row neighboring samples or extended left-column neighboring samples.

As mentioned above, depth Intra prediction using depth map modelling (DMM) has similar case-1 and case-2 prediction modes. In order to simplify the DMM process, embodiments according to the present invention use a simplified DMM where the conventional case-1 and case-2 prediction modes are unified. As mentioned before, the conventional case-1 prediction mode corresponds to both bT and bL being equal to 1 while the conventional case-2 prediction mode corresponds to both bT and bL being equal to 0. These two cases result in a similar Intra prediction pattern. Therefore, embodiments of the present invention form a unified prediction mode that combines the conventional case-1 prediction mode and the conventional case-2 prediction mode. The new unified prediction mode can be determined by checking whether bT is the same as bL. In other words, if the result, (bT==bL ?) is asserted, the new unified prediction mode is selected.

Figures 1, 3:
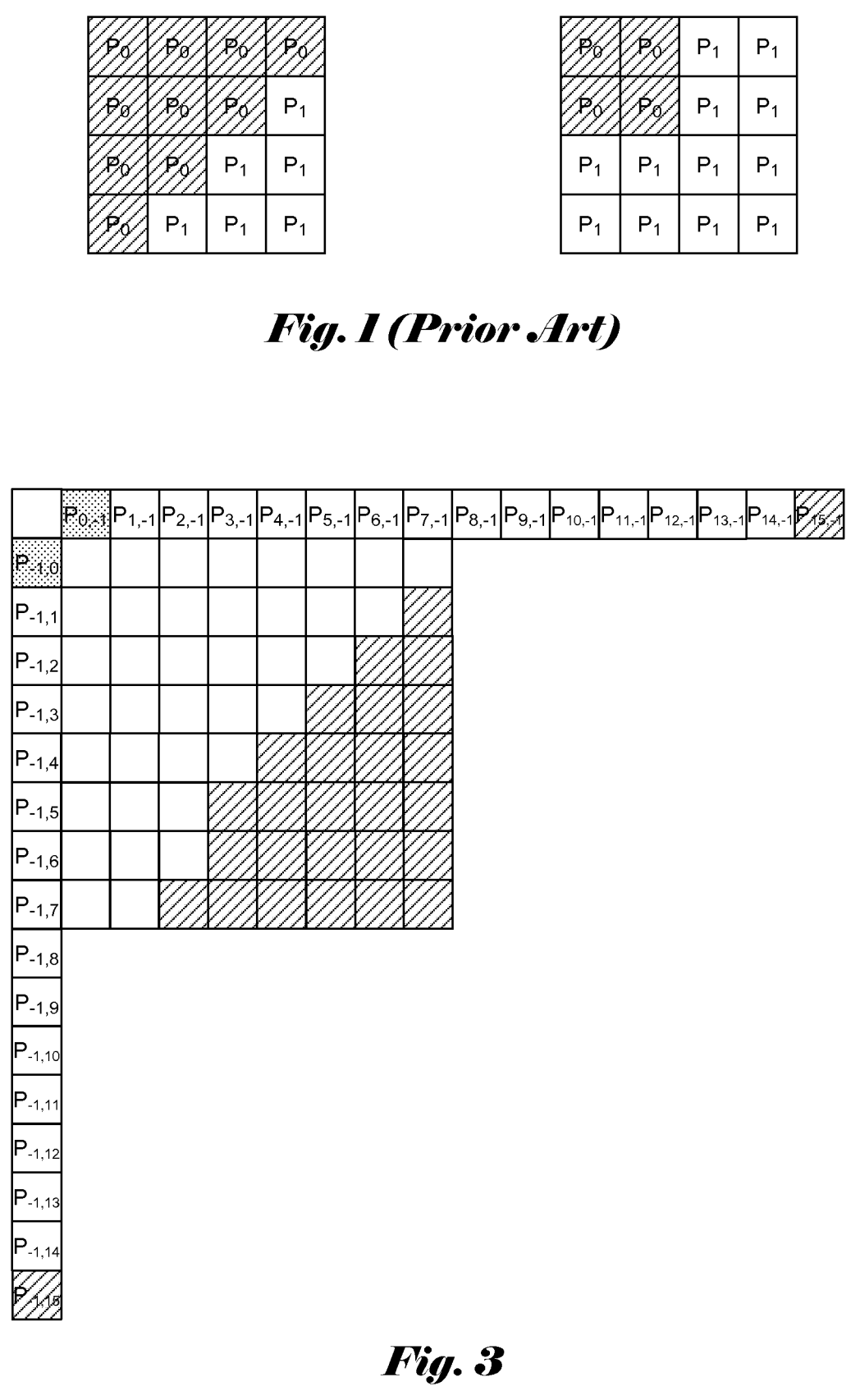
Figure 2:
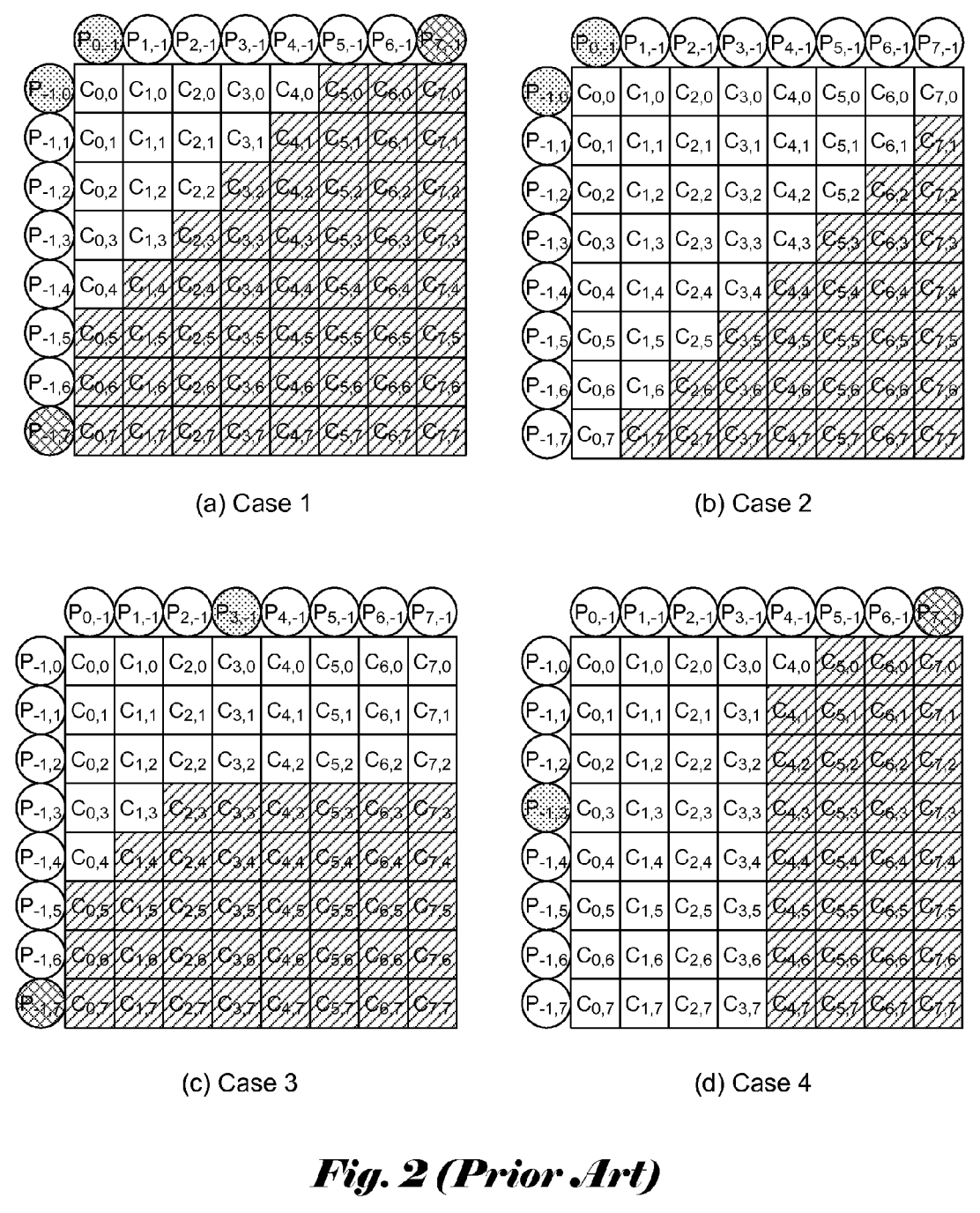

Embodiments according to the present invention also use a new DC value for the unified prediction mode as shown in FIG. 3, where the unified case corresponds to the conventional case 2 in FIG. 2. The block size is assumed to be N×N. The extended neighboring reference pixels, $(P_{-1,2*N-1})$ and $(P_{2*N-1,-1})$ are checked. If both the extended neighboring reference pixels are available, the absolute difference between $(P_{-1,2*N-1})$ and $(P_{-1,0})$ and the absolute difference between $(P_{2*N-1,-1})$ and $(P_{0,-1})$ are calculated. If $\text{abs}(P_{-1,2*N-1}-P_{-1,0})$ is larger than $\text{abs}(P_{2*N-1,-1}-P_{0,-1})$, the value of $(1)_{-1,2*N-1}$ is used as the DC predictor of the right-bottom partition (i.e., segment 1). If $\text{abs}(P_{-1,2*N-1}-P_{-1,0})$ is smaller than or equal to $\text{abs}(P_{2*N-1,-1}-P_{0,-1})$, the value of $(P_{2*N-1,-1})$ is used as the DC predictor of the right-bottom partition (i.e., segment 1). Accordingly, the DC value of segment 1 (i.e., the bottom-right segment) for the unified prediction mode can be described by the following pseudo code:

$DC_{1-X}=\text{abs}(P_{-1,2*N-1}-P_{-1,0})>\text{abs}(P_{2*N-1,-1}-P_{0,-1})$ ? $P_{-1,2*N-1}:P_{2*N-1,-1}$.

The particular steps of using the extended neighboring samples to derive a prediction sample for a segment as shown above is intended to illustrate an example of embodiment of the present invention. By no means, the illustration is exhaustive. A person skilled in the art may perform other tests to determine various ways to derive the prediction value. For example, the process of evaluating the absolute difference between the two ending samples of the extended top row neighboring samples (i.e., $\text{abs}(P_{2*N-1,-1}-P_{0,-1})$) and the absolute difference between the two ending samples of the extended left column neighboring samples (i.e., $\text{abs}(P_{-1,2*N-1}-P_{-1,0})$) may be replaced by other process. Furthermore, in the above example, either $(P_{-1,2*N-1})$ or $(P_{2*N-1,-1})$ is selected as the prediction value for a segment, other neighboring sample or samples may be used to derive the prediction value. For example, the prediction may be selected from any sample from the extended left column neighboring samples and/or the extended top row neighboring samples, such as $P_{X,-1}$ or $P_{-1,X}$ and X is selected from a group of integers staring from 0 to (2N-1). A combination of multiple neighboring samples from the extended left column neighboring samples and/or the extended top row neighboring samples can be used to derive the prediction value for a segment. For example, the prediction sample may be derived according to $(P_{X,-1}+P_{-1,X}+1)\!>\!>\!1$ or $(P_{X,-1}+P_{-1,X})\!>\!>\!1$, wherein ">>" corresponds to a right-shift operation and X is selected from a group of integers staring from 0 to (2N-1). In another embodiment, the neighboring depth sample may also include the corner sample at $P_{-1,-1}$.

For the unified case, the DC value for the upper-left partition (i.e., segment 0) is derived the same way as the conventional case-1 and case-2 prediction modes. In other words, the DC value of segment 0 is determined according to: $DCX=(P_{-1,0}+P_{0,-1})\!>\!>\!1$.

Moreover, if the conventional Intra prediction modes (mode 0 to mode 34) for texture data are used for depth map Intra prediction, the filtering process of neighbouring samples corresponding to the top neighboring row or the left neighboring column will be skipped when the PU size is smaller than 16. The information of segments generated from partition may have to be conveyed from an encoder to a decoder. The segments can be coded using chain coding.

In the above example, the extended neighboring depth samples are used to derive the prediction value for each segment for depth block partition using a unified DMM prediction mode. The prediction value derivation based on extended neighboring depth samples may also be applied to a segment in a convention DMM prediction mode. For example, any of the cases (i.e., case-1 to case-4) may use the extended neighboring depth samples according to embodiments of the present invention to derive the prediction value for a segment.

As mentioned earlier, the present invention is intended to simplify the depth Intra coding using depth map modelling (DMM) process without causing noticeable performance degradation. Embodiments of the present invention unified the conventional case-1 and case-2 DMM modes into a new unified DMM mode. Therefore, the number of cases for DMM mode is reduced to 3 from 4. The performance of a 3D video coding system incorporating a new unified DMM mode is compared to the performance of a conventional system based on HTM-7.0 (High Efficiency Video Coding, HEVC Test Model version 7.0) for common test condition (CTC) as shown in Table 1. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 1, BD-rate measure for view 1 and view 2 incurs no performance loss compared to the conventional HTM-7.0. There is even 0.1% BD-rate reduction for view 2. The BD-rate measure for the coded video PSNR with video bitrate and the coded video PSNR with total bitrate (texture bitrate and depth bitrate) are about the same as the conventional HTM-7.0. The synthesized video PSNR with total bitrate shows 0.1% BD-rate reduction. The processing times (encoding time, decoding time and rendering time) are about the same.

FIG. 4 illustrates an exemplary flowchart of a three-dimensional video coding system incorporating extended reconstructed neighboring depth samples for deriving the prediction value for at least one segment of the partition according to an embodiment of the present invention. The system receives input data associated with a current depth block, wherein the current depth block is partitioned into one or more segments as shown in step 410. For encoding, the input data corresponds to depth data to be encoded. For decoding, the input data corresponds to coded depth data to be decoded. The input data may be retrieved from memory (e.g., computer memory, buffer (RAM or DRAM) or other media) or from a processor. The reconstructed neighboring depth samples of the current depth block are received as shown in step 420. A prediction value is derived for each segment based on reconstructed neighboring depth samples as shown in step 430. The reconstructed neighboring depth samples for at least one segment comprise at least one

TABLE 1

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | −0.1% | 0.0% | 0.0% | 0.0% | 0.0% | 99.5% | 94.2% | 99.9% |
| Kendo | 0.0% | 0.1% | −0.1% | 0.0% | 0.0% | 0.0% | 100.1% | 107.0% | 103.6% |
| Newspapercc | 0.0% | 0.1% | −0.1% | 0.0% | 0.0% | −0.3% | 99.4% | 99.1% | 97.8% |
| GhostTownFly | 0.0% | −0.1% | −0.1% | 0.0% | 0.0% | −0.1% | 100.7% | 95.3% | 99.6% |
| PoznanHall2 | 0.0% | 0.1% | −0.4% | −0.1% | −0.1% | −0.1% | 100.1% | 98.5% | 104.5% |
| PoznanStreet | 0.0% | −0.1% | 0.0% | 0.0% | 0.0% | −0.1% | 99.8% | 94.6% | 100.2% |
| UndoDancer | 0.0% | 0.0% | 0.0% | 0.0% | 0.0% | 0.0% | 100.0% | 107.4% | 102.6% |
| 1024 × 768 | 0.0% | 0.0% | −0.1% | 0.0% | 0.0% | −0.1% | 99.7% | 100.1% | 100.5% |
| 1920 × 1088 | 0.0% | 0.0% | −0.1% | 0.0% | 0.0% | −0.1% | 100.2% | 98.9% | 101.7% |
| average | 0.0% | 0.0% | −0.1% | 0.0% | 0.0% | −0.1% | 99.9% | 99.4% | 101.2% |

The performance of a 3D video coding system incorporating the new unified DMM mode is also compared to the performance of a conventional system based on HTM-7.0 (High Efficiency Video Coding, HEVC Test Model version 7.0) under All Intra (AI) configuration as shown in Table 2. As shown in Table 2, BD-rate measure for view 1 and view 2 incurs no performance loss compared to the conventional HTM-7.0. The BD-rate measure for the coded video PSNR with video bitrate and the coded video PSNR with total bitrate (texture bitrate and depth bitrate) are about the same as the conventional HTM-7.0. The synthesized video PSNR with total bitrate shows 0.1% BD-rate reduction. The processing times (encoding time, decoding time and rendering time) are about the same.

reconstructed sample from an extended top neighboring row or an extended left neighboring column. The extended top neighboring row includes at least one extended top-row reconstructed depth sample located adjacent to top side of a second depth block adjacent to right side of the current depth block. The extended left neighboring column includes at least one extended left-column reconstructed depth sample located adjacent to left side of a third depth block adjacent to bottom side of the current depth block. Each segment of the current depth block is then encoded or decoded using the prediction value as shown in step 440.

Figure 5:
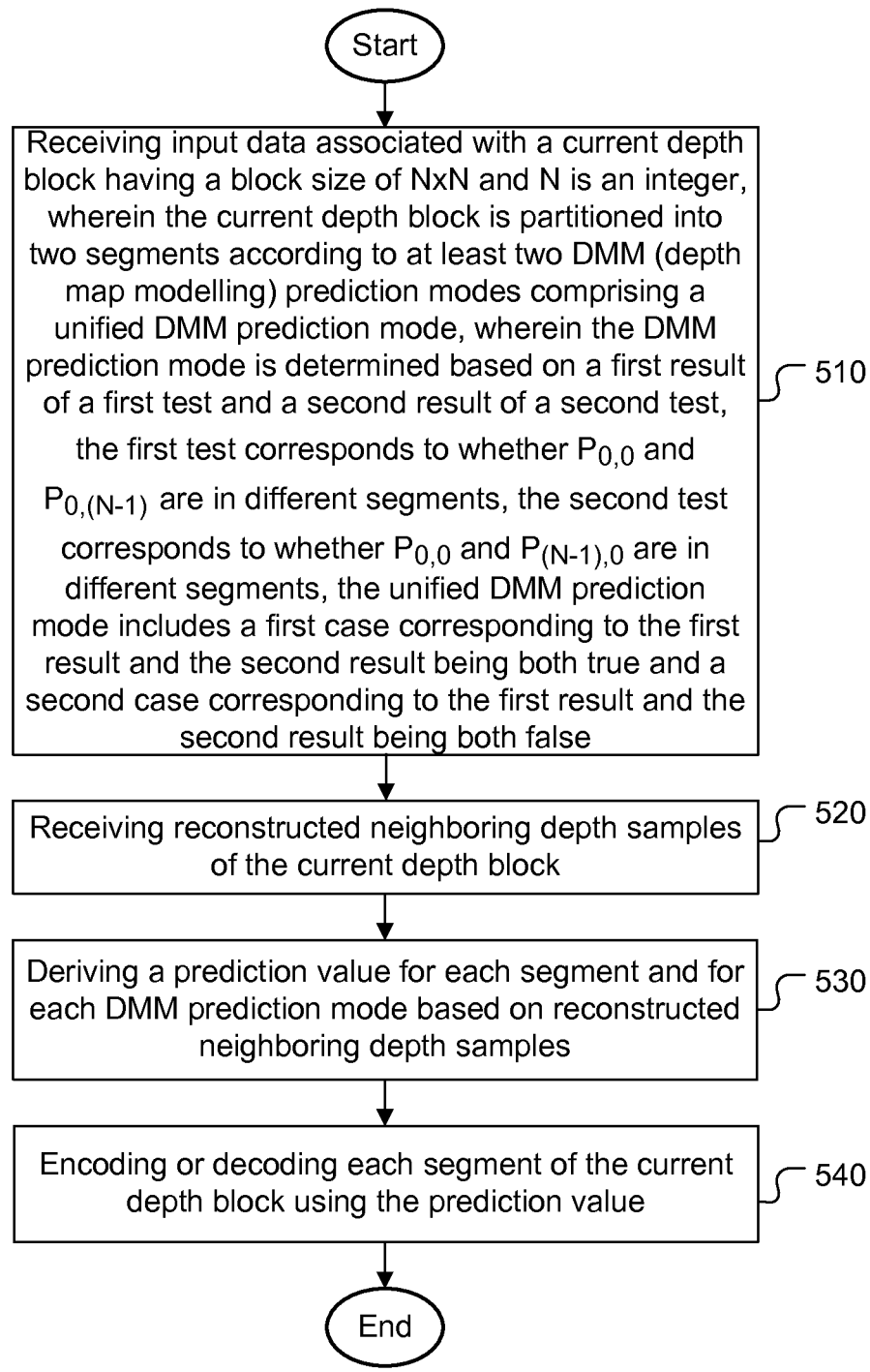
FIG. 5 illustrates an exemplary flowchart of a three-dimensional video coding system incorporating an embodiment of the present invention to use a unified DMM prediction mode corresponding to a combination of conventional case-1 and case-2 unified DMM prediction modes.

FIG. 5 illustrates an exemplary flowchart of a three-dimensional video coding system incorporating a unified depth map modelling (DMM) prediction mode according to

TABLE 2

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | 0.0% | 0.0% | 0.0% | 0.0% | 0.0% | 99.4% | 97.0% | 98.7% |
| Kendo | 0.0% | 0.0% | 0.0% | 0.0% | 0.0% | 0.0% | 100.0% | 96.3% | 97.1% |
| Newspapercc | 0.0% | 0.0% | 0.0% | 0.0% | 0.0% | −0.1% | 99.8% | 96.9% | 100.2% |
| GhostTownFly | 0.0% | 0.0% | 0.0% | 0.0% | 0.0% | −0.1% | 99.2% | 98.2% | 98.7% |
| PoznanHall2 | 0.0% | 0.0% | 0.0% | 0.0% | 0.0% | −0.1% | 100.2% | 93.7% | 97.5% |
| PoznanStreet | 0.0% | 0.0% | 0.0% | 0.0% | 0.0% | −0.1% | 98.1% | 100.0% | 99.1% |
| UndoDancer | 0.0% | 0.0% | 0.0% | 0.0% | 0.0% | 0.0% | 100.0% | 101.7% | 96.7% |
| 1024 × 768 | 0.0% | 0.0% | 0.0% | 0.0% | 0.0% | −0.1% | 99.7% | 96.7% | 98.7% |
| 1920 × 1088 | 0.0% | 0.0% | 0.0% | 0.0% | 0.0% | −0.1% | 99.4% | 98.4% | 98.0% |
| average | 0.0% | 0.0% | 0.0% | 0.0% | 0.0% | −0.1% | 99.5% | 97.7% | 98.3% | an embodiment of the present invention. Input data associated with a current depth block having a block size of N×N is received in step 510 and N is an integer. The current depth block is partitioned into two segments according to at least two DMM (depth map modelling) prediction modes comprising a unified DMM prediction mode. The DMM prediction mode is determined based on a first result of a first test and a second result of a second test. The first test corresponds to whether $P_{0,0}$ and $P_{0,(N-1)}$ are in different segments. The second test corresponds to whether $P_{0,0}$ and $P_{(N-1),0}$ are in different segments. The unified DMM prediction mode includes a first case corresponding to the first result and the second result being both true and a second case corresponding to the first result and the second result being both false. Reconstructed neighboring depth samples of the current depth block are received in step 520. A prediction value for each segment and for each DMM prediction mode is derived based on reconstructed neighboring depth samples in step 530. Each segment of the current depth block is then encoded or decoded using the prediction value as shown in step 540.

The flowcharts shown above are intended to illustrate examples of prediction value derivation for each segment of depth block partition in 3D coding according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Intra coding for a depth block in a three-dimensional video coding system, the method comprising:
    receiving input data associated with a current depth block, wherein the current depth block is partitioned into one or more segments;
    receiving reconstructed neighboring depth samples of the current depth block;
    deriving a prediction value for each segment based on reconstructed neighboring depth samples, wherein the reconstructed neighboring depth samples for at least one segment comprise at least one reconstructed sample from an extended top neighboring row or an extended left neighboring column, the extended top neighboring row includes at least one extended top-row reconstructed depth sample located adjacent to top side of a second depth block adjacent to right side of the current depth block, and the extended left neighboring column includes at least one extended left-column reconstructed depth sample located adjacent to left side of a third depth block adjacent to bottom side of the current depth block; and
    encoding or decoding each segment of the current depth block using the prediction value,
    wherein the current depth block corresponds to an N×N block, N is an integer, upper-left corner sample of the current block is designated as $P_{0,0}$, lower-right corner sample of the current block is designated as $P_{(N-1),(N-1)}$, the extended top neighboring row comprises $\{P_{N,-1}, \ldots, P_{2N-1,-1}\}$, the extended left neighboring column comprises $\{P_{-1,N}, \ldots, P_{-1,2N-1}\}$,
    wherein when a result of a first test associated with two top row reference depth samples of the current depth block is identical to a result of a second test associated with two left column reference depth samples of the current depth block:
    selecting $P_{X,-1}$ or $P_{-1,X}$ as a prediction value for one segment of the current depth block according to a comparison of an absolute difference of two ending samples of the extended top neighboring row and an absolute difference of two ending samples of the extended left neighboring column, wherein X is selected from a group of integers starting from 0 to (2N−1).

2. The method of claim 1, wherein the current depth block is partitioned into two segments and the two segments are coded using chain coding.

3. The method of claim 1, wherein when the absolute difference of two ending samples of the extended top neighboring row is greater than the absolute difference of two ending samples of the extended left neighboring column, selecting $P_{X,-1}$ as the prediction value for said one segment of the current depth block.

4. The method of claim 1, wherein when the absolute difference of two ending samples of the extended top neighboring row is not greater than the absolute difference of two ending samples of the extended left neighboring column, selecting $P_{-1,X}$ as the prediction value for said one segment of the current depth block.

5. The method of claim 1, wherein X is 2N−1.

6. An apparatus of Intra coding for a depth block in a three-dimensional video coding system, the apparatus comprising one or more electronics configured to:
  receive input data associated with a current depth block, wherein the current depth block is partitioned into one or more segments;
  receive reconstructed neighboring depth samples of the current depth block;
  derive a prediction value for each segment based on reconstructed neighboring depth samples, wherein the reconstructed neighboring depth samples for at least one segment comprise at least one reconstructed sample from an extended top neighboring row or an extended left neighboring column, the extended top neighboring row includes at least one extended top-row reconstructed depth sample located adjacent to top side of a second depth block adjacent to right side of the current depth block, and the extended left neighboring column includes at least one extended left-column reconstructed depth sample located adjacent to left side of a third depth block adjacent to bottom side of the current depth block; and
  encode or decode each segment of the current depth block using the prediction value,
  wherein the current depth block corresponds to an N×N block, N is an integer, upper-left corner sample of the current block is designated as $P_{0,0}$, lower-right corner sample of the current block is designated as $P_{(N-1),(N-1)}$, the extended top neighboring row comprises $\{P_{N,-1}, \ldots, P_{2N-1}\}$, the extended left neighboring column comprises $\{P_{-1,N}, \ldots, P_{-1,2N-1}\}$,
  wherein when a result of a first test associated with two top row reference depth samples of the current depth block is identical to a result of a second test associated with two left column reference depth samples of the current depth block:
  $P_{X,-1}$ or $P_{-1,X}$ is selected as a prediction value for one segment of the current depth block according to a comparison of an absolute difference of two ending samples of the extended top neighboring row and an absolute difference of two ending samples of the extended left neighboring column, wherein X is selected from a group of integers starting from 0 to (2N−1).

7. The apparatus of claim 6, wherein when the absolute difference of two ending samples of the extended top neighboring row is greater than the absolute difference of two ending samples of the extended left neighboring column, $P_{X,-1}$ is selected as the prediction value for said one segment of the current depth block.

8. The apparatus of claim 6, wherein when the absolute difference of two ending samples of the extended top neighboring row is not greater than the absolute difference of two ending samples of the extended left neighboring column, $P_{-1,X}$ is selected as the prediction value for said one segment of the current depth block.

9. The apparatus of claim 6, wherein X is 2N−1.

* * * * *